April 23, 1935. T. T. ARDEN 1,998,649
GAS COCK
Filed Aug. 23, 1934
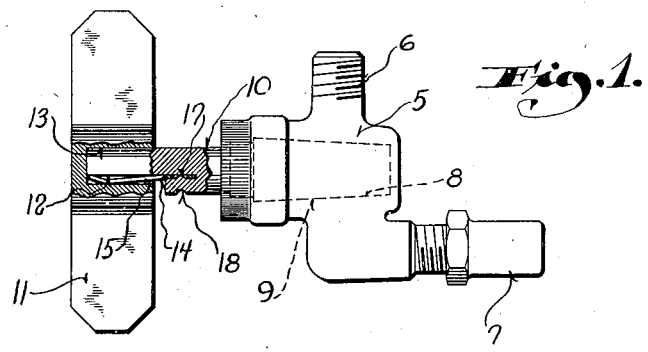
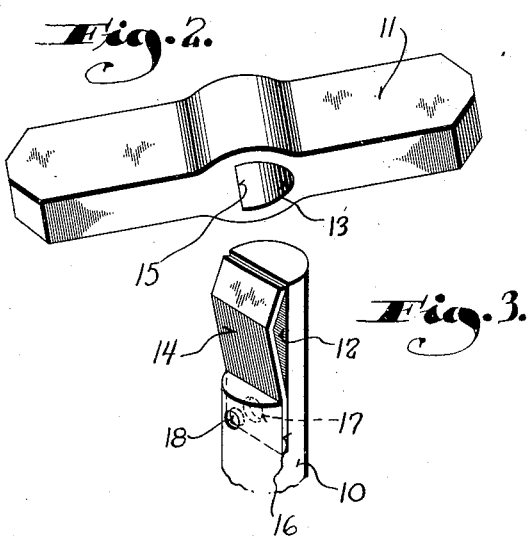
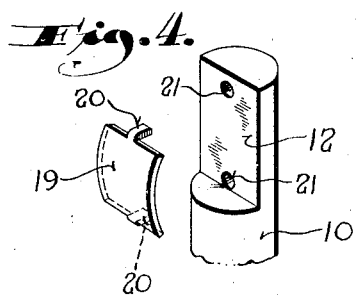
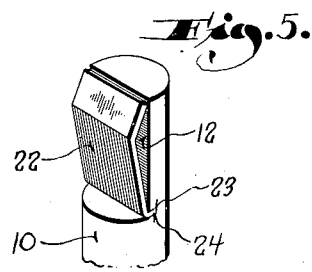
Inventor
Thomas T. Arden
By Dewitt Jones
Attorney Patented Apr. 23, 1935

1,998,649

UNITED STATES PATENT OFFICE 1,998,649

GAS COCK

Thomas T. Arden, Milwaukee, Wis., assignor to Milwaukee Gas Specialty Company, Milwaukee, Wis., a corporation of Wisconsin Application August 23, 1934, Serial No. 741,038

3 Claims. (Cl. 287—53)

This invention relates to improvements in gas cocks and refers more particularly to the attachment of handles to the stems.

Heretofore, it has been customary to secure the handles to the valve stems of the gas cocks by conventional set screws threaded in the handle and bearing against the valve stem.

Inasmuch as the handles are generally molded of a thermoplastic substance, the threading of set screws into the handle is an obvious objection, and it is therefore, an object of this invention to provide an improved manner of attaching a handle to the valve stem of a gas cock wherein the use of set screws is entirely obviated.

Another object of this invention is to provide novel spring means automatically operable to secure the handle in position merely by the application of the handle to the stem.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates several complete examples of the physical embodiment of the invention constructed according to the best modes so far devised for the practical application of the principles thereof, and in which:

Figure 1 is a side view of a gas cock embodying this invention, with part of the handle and the valve stem broken away and in section;

Figure 2 is a perspective view of the handle shown detached from the stem;

Figure 3 is a perspective view of the outer end portion of the stem showing one type of spring for securing the handle to the stem; and Figures 4 and 5 are perspective views of the outer end portion of the stem showing other spring structures for securing the handle in place.

Referring now more particularly to the accompanying drawing, the numeral 5 designates the body of a conventional gas cock having a threaded inlet end 6 connectible to the stringer pipe, and an outlet provided with a discharge jet 7. As is customary, the body of the gas cock has a tapered bore 8 communicated with the inlet end 6 and discharge jet 7 and receiving therein a tapered plug 9.

The plug 9 is secured in the tapered bore in any suitable manner and has an outer projecting end or stem 10 to which a handle 11 is secured.

To preclude relative rotation between the handle and the stem the outer end portion of the stem has one side cut away or slabbed off to provide a flat surface 12, and the socket 13 in the handle which receives the stem is of corresponding shape in cross section.

Heretofore, the handle was secured to the stem by means of a conventional set screw threaded in the handle and bearing against the stem, but as pointed out hereinbefore, this manner of securing the handle in place is objectionable. The present invention overcomes the objections which the use of a set screw or similar method of attachment entails, in a novel and exceedingly simple manner.

To hold the handle to the stem, spring tension is used, which is conveniently obtained by means of a flat leaf spring 14 overlying the flat surface 12 of the stem and shaped to engage the flat wall 15 of the socket in the handle with a spring tension upon application of the handle to the stem.

The specific shape and manner of attaching the spring to the stem is susceptible to modification and in Figures 1 and 3, the spring is fixed to the stem by having its inner end portion received in a longitudinal slot 16 extending inwardly from the slabbed off portion with one side of the slot flush with the flat surface 12, where it is held by a small tit struck inwardly from one side of the slot 16 and engaging in a hole 17 in the adjacent portion of the spring. To facilitate formation of the tit, the stem has a shallow hole 18 drilled in the side thereof opposite the hole 17.

The portion of the spring overlying the flat surface 12 is bent to form an obtuse angle with the apex thereof engageable with the flat wall 15 of the socket. The space between the flat walls 12 and 15 when the handle is in place is but slightly greater than the thickness of the spring. Consequently, as the handle is pressed onto the stem, the spring 14 is compressed so that its spring tension automatically secures the handle in place.

In Figure 4, the spring 19 has two tangs 20 directed from its opposite ends to engage in holes 21 formed in the stem and opening to its flat surface 12. The spring is curved as shown and the holes 21 are of sufficient size to permit a slight shifting of the tangs 20 therein, as the spring is compressed upon application of the handle to the stem.

In Figure 5, the spring 22 is of the same general shape as that shown in Figures 1 and 3, but the manner of attachment differs. As here shown, the inner end of the spring is directed laterally as at 23 to engage in a transverse slot 24 in the stem, cut inwardly of its flat surface 12.

From the foregoing description taken in connection with the accompanying drawing, it will be readily apparent to those skilled in the art to which this invention appertains, that this invention affords an exceedingly simple and efficient manner of securing the handle of a gas cock to its valve stem, and that while no positive means of securing the handle to the stem are employed, the spring tension afforded by the flat spring carried by the stem engages the socket of the handle with sufficient tension to hold the handle in place during all normal usage, while at the same time permitting quick detachment for the purposes of replacement.

What I claim as my invention is:

1. In combination, a rotatable valve stem having an end portion slabbed off to afford a flat surface substantially parallel to the axis of the stem and having a longitudinal slot extending inwardly from the inner end of said flat surface with one side of said slot forming substantially a continuation of said flat surface, a handle having a socket in which said end portion of the stem is received and which socket is of corresponding shape in cross section, whereby the socket has a flat surface opposite the flat surface of the stem, and means to hold the handle to the stem comprising a flat leaf spring having an end portion fixed in the longitudinal slot of the stem and overlying the flat surface of the stem with said overlying portion bowed outwardly to engage the flat surface of the socket with a spring tension.

2. In combination, a rotatable valve stem having an end portion slabbed off to afford a flat surface substantially parallel to the axis of the stem and having a slot adjacent the inner end of said flat surface, a handle having a socket in which said end portion of the stem is received and which socket has a cross sectional shape corresponding to that of the end portion of the stem so that the socket has a flat surface opposite the flat surface of the stem, and means to secure the handle to the stem comprising a flat leaf spring having an inner end portion received in the slot of the stem and an outer portion overlying the flat surface of the stem and bowed outwardly to engage the flat surface of the socket with a spring tension.

3. In combination, a rotatable valve stem having an end portion slabbed off to afford a flat surface axial to the stem, a handle having a socket in which said end portion of the stem is received and said socket having a cross sectional shape corresponding to that of the end portion of the stem so that the socket has a flat wall surface opposite the flat surface of the stem, and means to hold the handle to the stem comprising a bowed spring overlying the flat surface of the socket, and tangs on the spring engaging in apertures formed in the stem and opening to its flat surface, whereby said spring is attached to the stem with its ends bearing against the flat surface of the stem and its medial bowed portion engaging the flat surface of the socket with a spring tension.

THOMAS T. ARDEN.